(12) United States Patent
Takanashi et al.

(10) Patent No.: US 11,794,431 B2
(45) Date of Patent: Oct. 24, 2023

(54) METHOD FOR MANUFACTURING TIRE

(71) Applicant: The Yokohama Rubber Co., LTD., Tokyo (JP)

(72) Inventors: Yuta Takanashi, Shinshiro (JP); Misaki Oka, Shinshiro (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 305 days.

(21) Appl. No.: 16/970,339

(22) PCT Filed: Nov. 29, 2018

(86) PCT No.: PCT/JP2018/043944
§ 371 (c)(1),
(2) Date: Aug. 14, 2020

(87) PCT Pub. No.: WO2019/159491
PCT Pub. Date: Aug. 22, 2019

(65) Prior Publication Data
US 2021/0078272 A1 Mar. 18, 2021

(30) Foreign Application Priority Data
Feb. 16, 2018 (JP) .................................. 2018-026477

(51) Int. Cl.
*B29D 30/16* (2006.01)
*B29D 30/14* (2006.01)

(52) U.S. Cl.
CPC .......... *B29D 30/1657* (2013.01); *B29D 30/14* (2013.01); *B29D 2030/1692* (2013.01)

(58) Field of Classification Search
CPC .. B29D 30/16; B29D 30/1642; B29D 30/165; B29D 30/1657; B29D 2030/1692; B29D 30/14
See application file for complete search history.

(56) References Cited

U.S. PATENT DOCUMENTS 6,355,126 B1  3/2002  Ogawa
6,669,798 B1  12/2003  Okada et al.
(Continued)

FOREIGN PATENT DOCUMENTS

JP  H11-099564  4/1999
JP  2003-514695  4/2003
(Continued)

OTHER PUBLICATIONS

International Search Report for International Application No. PCT/JP2018/043944 dated Mar. 5, 2019, 4 pages, Japan.

*Primary Examiner* — Geoffrey L Knable
(74) *Attorney, Agent, or Firm* — THORPE NORTH & WESTERN

(57) ABSTRACT

A method for manufacturing a tire includes forming a belt layer by bonding strip materials adjacent in the circumferential direction on the molding surface located on the outer circumferential side of the rigid core. Along the profile in the width direction of an outer circumferential surface of the rigid core, the rigid core is moved so that the molding surface is brought close to the strip material to be bonded, and the strip material is bonded to the molding surface extending in the longitudinal direction while rotating the rigid core in a direction in which the circumferential angle of the rigid core with respect to the longitudinal direction of the strip material changes, so that variation in the bonding margin, due to the position of the rigid core in the width direction, between strip materials that have been adjacently bonded to the molding surface in the circumferential direction is reduced.

2 Claims, 17 Drawing Sheets

(56) References Cited

U.S. PATENT DOCUMENTS

| | | | |
|---|---|---|---|
| 6,702,913 B2* | 3/2004 | Marchini | B29D 30/1657 152/526 |
| 8,945,323 B2* | 2/2015 | Fujiki | B29D 30/28 156/421.6 |
| 2002/0023705 A1 | 2/2002 | Marchini et al. | |
| 2004/0079487 A1 | 4/2004 | Marchini et al. | |
| 2005/0269014 A1 | 12/2005 | Mizota | |
| 2013/0276956 A1 | 10/2013 | Cantu et al. | |
| 2016/0229138 A1* | 8/2016 | Grolleman | B29D 30/28 |
| 2017/0080658 A1* | 3/2017 | Takenaka | B29D 30/0601 |
| 2017/0282471 A1* | 10/2017 | Marchini | B29D 30/16 |

FOREIGN PATENT DOCUMENTS

| | | |
|---|---|---|
| JP | 2004-202804 | 7/2004 |
| JP | 2012-171183 | 9/2012 |
| JP | 2016-215584 | 12/2016 |
| WO | WO 99/17920 | 4/1999 |
| WO | WO 01/38077 | 5/2001 |
| WO | WO 2004/062897 | 7/2004 |
| WO | WO-2006/129326 A1 * | 12/2006 |
| WO | WO 2012-080797 | 6/2021 |

* cited by examiner

METHOD FOR MANUFACTURING TIRE

TECHNICAL FIELD

The present technology relates to a method for manufacturing a tire, and more specifically, relates to a method for manufacturing a tire in which when forming a belt layer by sequentially arranging and attaching a large number of strip materials to the outer circumferential surface of a rigid core in a circumferential direction, and bonding strip materials that are adjacent in the circumferential direction, it is possible to suppress bonding disorder between the strip materials due to the circumferential length of the outer circumferential surface of the rigid core that varies depending on the position of the rigid core in the width direction.

BACKGROUND

A pneumatic tire is manufactured by vulcanizing an unvulcanized green tire formed by laminating tire components on a molding surface of the outer circumference of a cylindrical forming drum. In the belt layer serving as the tire components, a plurality of reinforcing cords aligned at a predetermined inclination angle with respect to the tire circumferential direction is coated with unvulcanized rubber. The belt layer is formed, for example, by applying a plurality of strip materials with a plurality of aligned reinforcing cords coated with unvulcanized rubber to the molding surface on the outer circumference of the forming drum in the circumferential direction, and bonding strip materials adjacent in the circumferential direction together (see Japan Unexamined Patent Publication No, H11-099564).

One method of forming a green tire is a method of sequentially laminating tire components on the outer circumference of a rigid core having an outer circumferential surface shape corresponding to the shape of the tire inner circumferential surface of the finished tire (for example, see Japan Unexamined Patent Publication No. 2012-171183). Tires typically have a profile in which the circumferential length varies depending on the position in the tire lateral direction. As a result, the outer circumferential surface of the rigid core also has a profile in which the circumferential length varies depending on the position in the width direction. Therefore, when the strip materials forming the belt layer are sequentially and simply extended in the width direction of the rigid core at a predetermined inclination angle with respect to the circumferential direction of the rigid core, and are arranged and bonded in the circumferential direction of the rigid core, depending on the position of the rigid core in the width direction, the overlap between adjacent strip materials in the circumferential direction is excessively large or excessively small, so that a variation occurs in the bonding margin between adjacent strip materials. The variation in the bonding margin adversely affects the quality of the manufactured tire, so there is room for improvement.

SUMMARY

The present technology provides a method for manufacturing a tire in which when forming a belt layer by sequentially arranging and attaching a large number of strip materials to the outer circumferential surface of a rigid core in a circumferential direction, and bonding strip materials that are adjacent in the circumferential direction, it is possible to suppress bonding disorder between the strip materials due to the circumferential length of the outer circumferential surface of the rigid core that varies depending on the position of the rigid core in the width direction.

A method for manufacturing a tire according the present technology is provided, comprising sequentially bonding a large number of strip materials on a molding surface located on an outer circumferential side of a rigid core having an outer circumferential surface with a profile in which a circumferential length changes at a position in a width direction, in manner of extending the strip materials in a width direction of the rigid core at an inclined direction with respect to a circumferential direction of the rigid core, and arranging and bonding the strip materials in the circumferential direction, so that a belt layer is formed by bonding together the strip materials that are adjacently bonded in the circumferential direction; forming a green tire having the belt layer; and vulcanizing the green tire, wherein, the rigid core is relatively moved along the profile that is preliminarily known so that the molding surface is brought close to the strip material to be bonded to the molding surface, and the strip materials to be bonded are extended in the longitudinal direction and bonded to the molding surface while relatively turning the rigid core in a direction in which a circumferential angle with respect to the longitudinal direction of the strip materials to be bonded changes, so that variation in bonding margin, due to the position in the width of the rigid core, between the strip materials to be bonded adjacent to each other in the circumferential direction is reduced.

According to the present technology, along the profile in the width direction of the outer circumferential surface of the rigid core that is preliminarily known, the rigid core is relatively moved so that the molding surface is brought close to the strip material to be bonded to the molding surface, and the strip material is bonded to the molding surface in a manner of extending in the longitudinal direction while relatively rotating the rigid core in a direction in which the circumferential angle of the rigid core with respect to the longitudinal direction of the strip material changes, and thus variation in the bonding margin, due to the position in the width direction of the rigid core, between strip materials that are adjacent in the circumferential direction and bonded to the molding surface is reduced. Therefore, this is advantageous to prevent the strip materials adjacent in the circumferential direction from excessively overlapping with each other, and also prevent gaps generated between adjacent strip materials. Accordingly, it is possible to suppress bonding disorder between the strip materials due to the circumferential length of the outer circumferential surface of the rigid core that varies depending on the position in the width direction. This contributes to improved quality of the manufactured tire.

DETAILED DESCRIPTION

Figure 1:
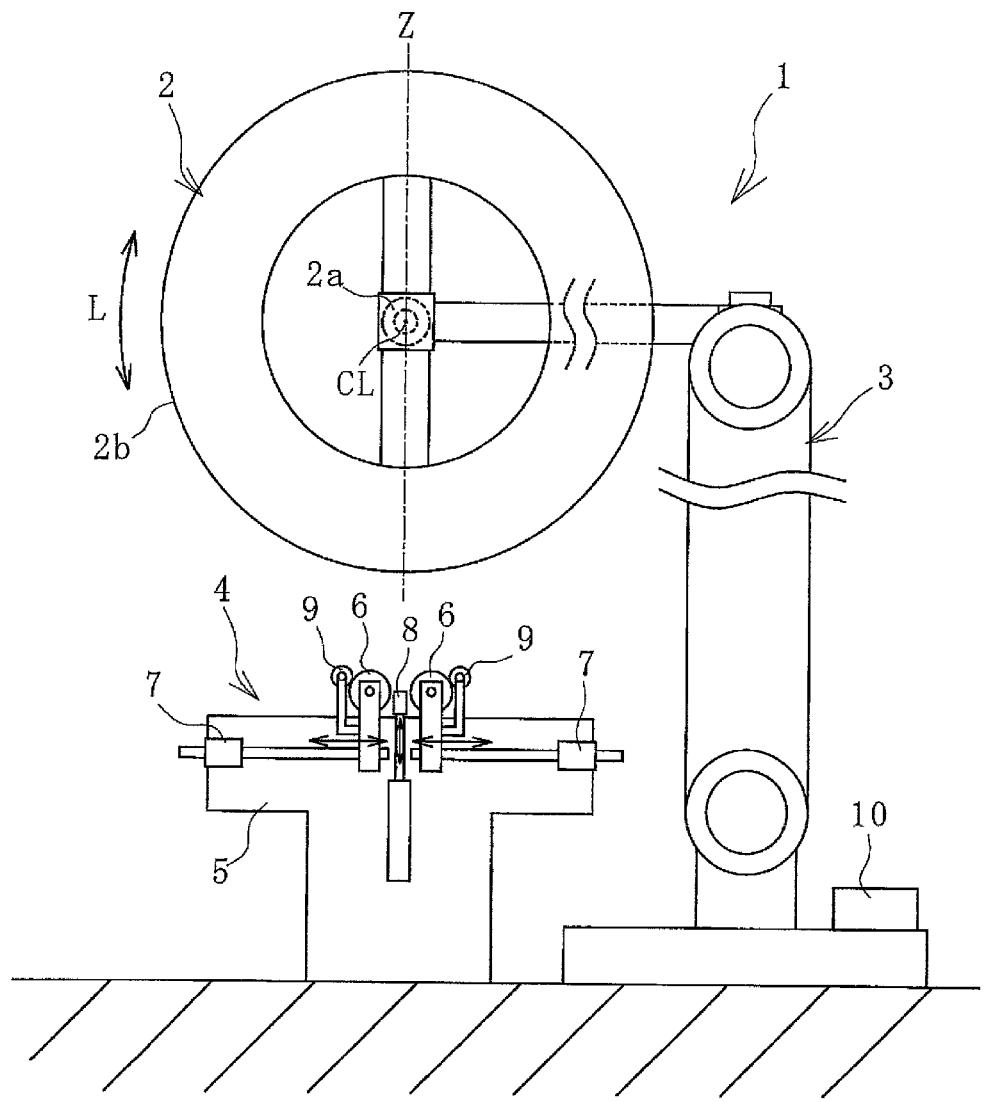
FIG. 1 is an explanatory diagram illustrating a forming device used in the present technology in a front view.

Hereinafter, a method for manufacturing a tire according to the present technology will be described based on embodiments illustrated in the drawings.

Figure 2:
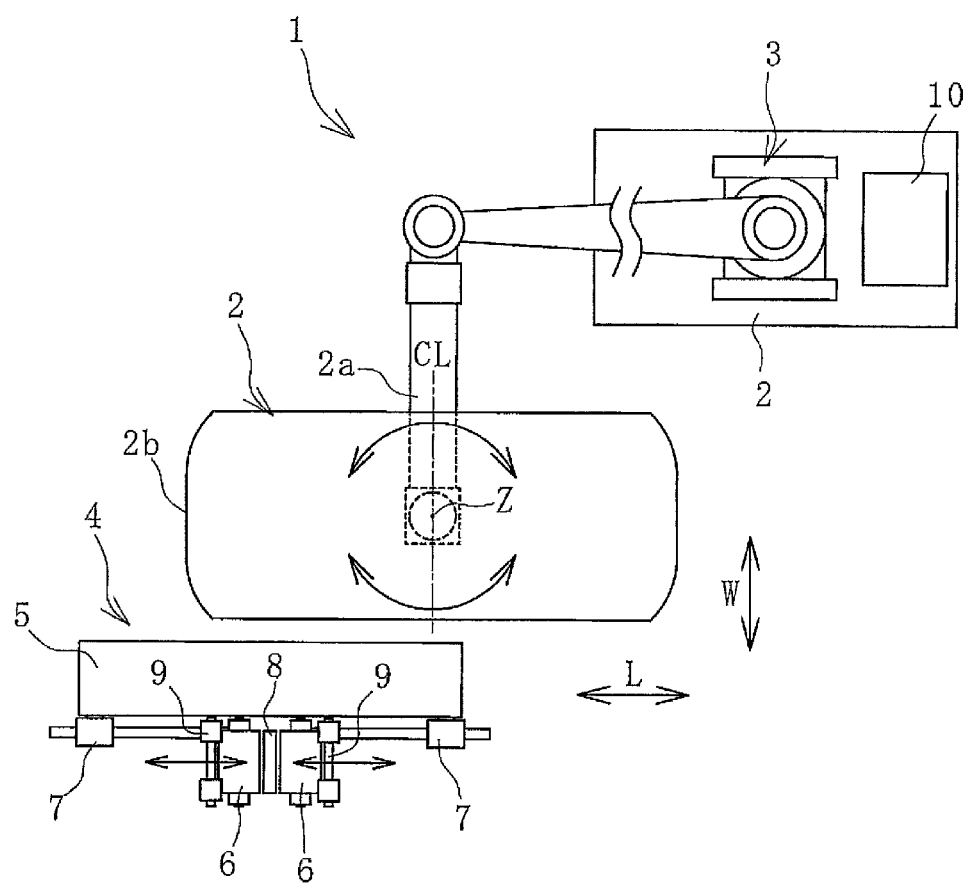
FIG. 2 is an explanatory diagram illustrating the forming device in FIG. 1 in a plan view.
Figure 3:
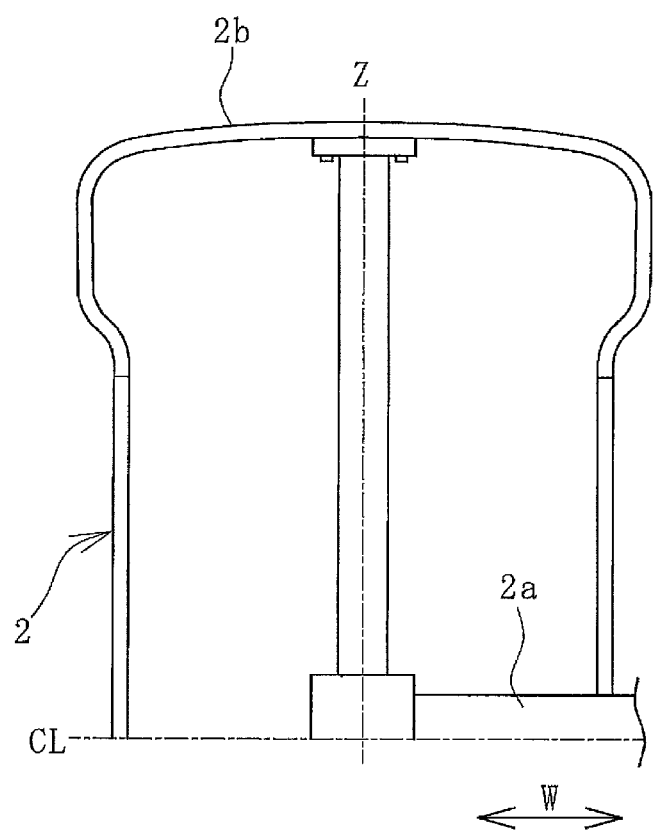
FIG. 3 is an explanatory diagram illustrating the upper half of the rigid core of FIG. 1 in a cross-sectional view.

According to the present technology, a tire 20 is manufactured by forming a green tire 19 using a forming device 1 illustrated in FIGS. 1 and 2 and vulcanizing the formed green tire 19. Note that the present technology is not limited to a typical pneumatic tire, and may be applied to the manufacturing of various tires 20 such as solid tires or the like. The rigid core 2 illustrated in FIGS. 1 to 3 that is formed from metal or the like is used for forming the green tire 19. The rigid core 2 has an outer circumferential surface shape corresponding to the shape of the tire inner circumferential surface of the completed tire 20. Therefore, as illustrated in FIG. 3, the outer circumferential surface 2b of the rigid core 2 has a profile in which the circumferential length changes depending on the position of the rigid core 2 in the width direction. In general, the rigid core 2 has a profile in which the central portion of the rigid core 2 in the width direction protrudes further toward outer circumferential side than both end portions. The rigid core 2 is composed of, for example, a plurality of segments divided in the circumferential direction about a center shaft 2a, and a support rod for supporting the segments from inside.

The width direction W and the circumferential direction L of the rigid core 2 correspond to the width direction and the circumferential direction of the green tire 19 and the completed tire 20, respectively. The dot-dash line CL in the figures indicates the tire axis (the axis of the center shaft 2a), and the dot-dash line Z indicates the revolution axis passing through the center of the rigid core 2 in the width direction W and orthogonal to the dot-dash line CL.

The forming device 1 includes a freely moving arm 3 for moving the rigid core 2 to an arbitrary position, a bonding unit 4 for bonding a strip material 16, and a control unit 10 for controlling the operations of the freely moving arm 3 and the bonding unit 4. Examples of the freely moving arm 3 include industrial robots and the like. The center shaft 2a of the rigid core 2 is held on the tip end portion of the freely moving arm 3, and the rigid core 2 is able to rotate about the center shaft 2a. In addition, the rigid core 2 is able to rotate about the revolution axis Z.

In this embodiment, the bonding unit 4 (base frame 5) is installed in a fixed state on the floor, and the rigid core 2 is movable; however, the rigid core 2 may be installed in a fixed state in a predetermined position and the bonding unit 4 is movably installed. Alternatively, the bonding unit 4 and the rigid core 2 may be movably installed. In other words, in the present technology, it is sufficient that the bonding unit 4 and the rigid core 2 are relatively movable.

The bonding unit 4 includes: a base frame 5, a pair of pressing rollers 6 attached to the base frame 5, and a movement mechanism 7 that horizontally moves the pressing rollers 6 in a direction toward or away from each other. The movement mechanism 7 includes, for example, a ball screw and a servo motor that rotates the ball screw. Alternatively, a fluid cylinder or the like may be used as the movement mechanism 7. Each of the pressing rollers 6 may be configured to independently move horizontally, or may be configured to move horizontally in synchronization with each other.

The bonding unit 4 further includes a pressing body 8 that moves vertically between the pressing rollers 6, and guides 9 disposed in the vicinity of each of the pressing rollers 6. Each guide 9 is spaced apart in the axial direction of the rotation shaft, and has an externally fitted guide roller. Each guide 9 is disposed on the outer side (side in the direction in which the pressing rollers 6 are separated away from each other) of the adjacent pressing roller 6, and is capable of moving horizontally along with the adjacent pressing rollers 6.

Next, a procedure for manufacturing the tire 20 according to the present technology will be described.

Figure 4:
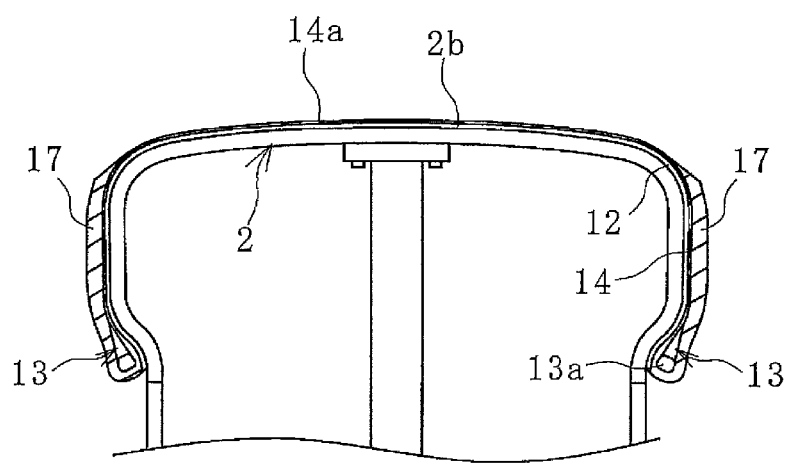
FIG. 4 is an explanatory diagram illustrating in a cross-sectional view, the upper half of the green tire during forming to which some of the tire components are bonded.

As illustrated in FIG. 4, predetermined tire components (such as an innerliner 12, a carcass layer 14, and the like) are sequentially bonded to the outer circumferential surface 2b of the rigid core 2 illustrated in FIGS. 1 and 2. More specifically, the innerliner 12 and the carcass layer 14 are laminated and bonded sequentially to the outer circumferential surface 2b of the rigid core 2 to form a cylindrical shape. On both sides of the rigid core 2 in the width direction, a ring-shaped bead member 13 is disposed on the carcass layer 14, and the carcass layer 14 is folded back around the bead core 13a of each of the bead members 13. In addition, unvulcanized side rubber 17 is laminated and bonded to both end portions of the carcass layer 14 in the width direction. Other tire components are also bonded as needed. Note that in FIGS. 5 to 8, tire components other than a belt layer 15 (strip material 16) are omitted and not illustrated.

Figure 5:
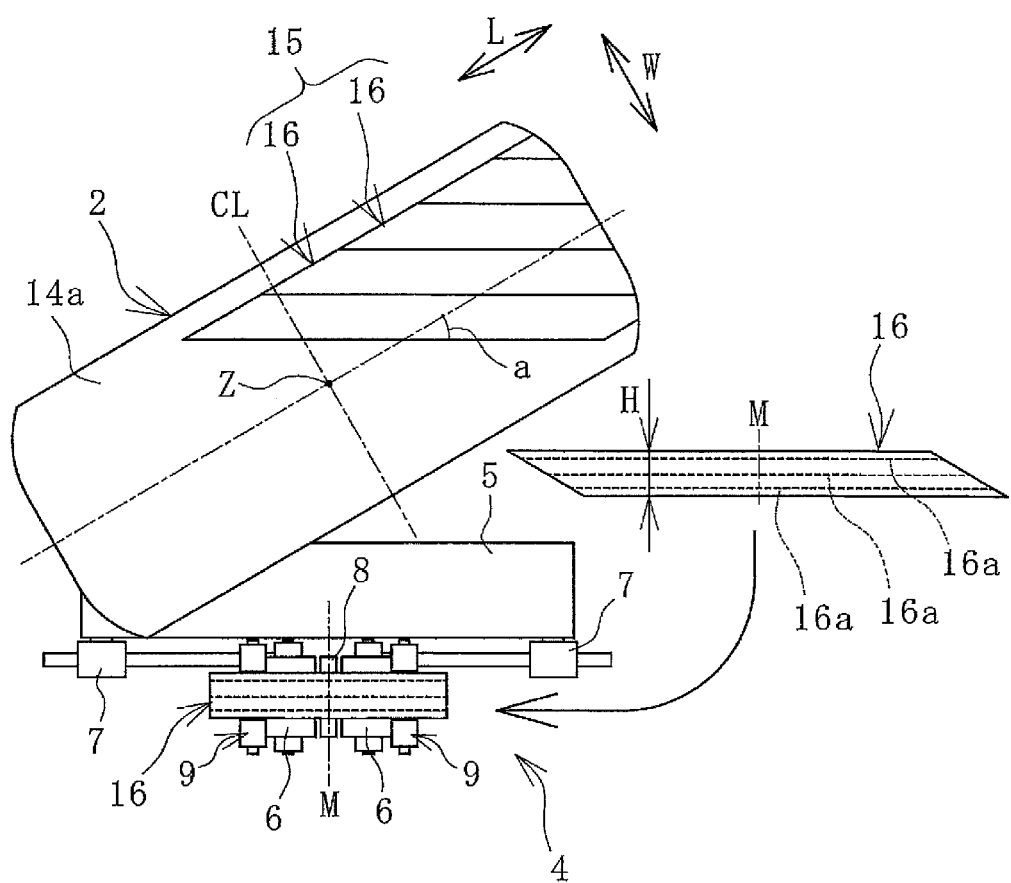
FIG. 5 is an explanatory diagram illustrating a step of bonding a strip material to the green tire of FIG. 4 in plan view of the forming device.

Next, the cylindrical belt layer 15 is formed on the outer circumferential surface (molding surface 14a) of the cylindrical carcass layer 14 that is bonded to the outer circumferential side of the rigid core 2. As illustrated in FIG. 5, the belt layer 15 is formed by bonding a plurality of strip materials 16. In the belt layer 15, a plurality of reinforcing cords 16a aligned at a predetermined inclination angle with respect to the tire circumferential direction is coated with unvulcanized rubber. The forming device 1 is used to form the belt layer 15.

Each of the strip materials 16 is formed by coating, with unvulcanized rubber, the plurality of reinforcing cords 16a that are aligned in parallel. Therefore, first, the strip materials 16 are sequentially arranged one by one over the pair of pressing rollers 6. At this time, as illustrated in FIG. 1, the pair of pressing rollers 6 are at positions close to each other, and the pressing body 8 is at a position where it does not project above the respective pressing rollers 6.

Each guide 9 is located at a position outside of the adjacent pressing roller 6 (on a side in a direction in which the pressing rollers 6 are separated from each other). The strip material 16 disposed is inserted between the pressing roller 6 and the guide 9 in such a manner to span over the pair of pressing rollers 6. The central portion M of the strip material 16 in longitudinal direction is set above the pressing body 8, and the strip material 16 is disposed between guide rollers of each of the guides 9. The separation distance between the guide rollers of the guides 9 is set to be slightly greater than the strip width H of the strip material 16; however, both are substantially of the same dimension.

The shape data of the rigid core 2 is inputted to the control unit 10, and the data of the profile of the outer circumferential surface 2b having a circumferential length that varies at the width direction position is also inputted to the control unit 10. In addition, various data such as shape data (length, width, thickness) of the tire components used (12, 13, 14, 15, and the like), specification data of the green tire 19 to be molded, and the like are also inputted.

Next, by cooperation of the rigid core 2 with the bonding unit 4, the strip material 16 is bonded to the outer circumferential surface 14a of the carcass layer 14 layered on the outer circumferential side of the rigid core 2. In other words, the outer circumferential surface of the carcass layer 14 becomes the molding surface 14a to which the strip material 16 is bonded.

In order to form the belt layer 15, a plurality of strip materials 16 are sequentially bonded to the molding surface 14a, extending in the width direction of the rigid core 2 in a direction oblique (inclination angle a) to the circumferential direction of the rigid core 2. Then, the strip materials 16 bonded to the molding surface 14a are bonded to each other in the circumferential direction to form the belt layer 15.

Here, the outer circumferential surface 2b of the rigid core 2 has a profile having a circumferential length that varies at the width direction position as described above. The innerliner 12 and the carcass layer 14 bonded sequentially to the outer circumferential surface 2b are members having a constant thickness, and thus the molding surface 14a to which the strip material 16 is bonded has a profile having a circumferential length (length in the circumferential direction) that varies at the width direction position in the same manner as the outer circumferential surface 2b.

Figure 6:
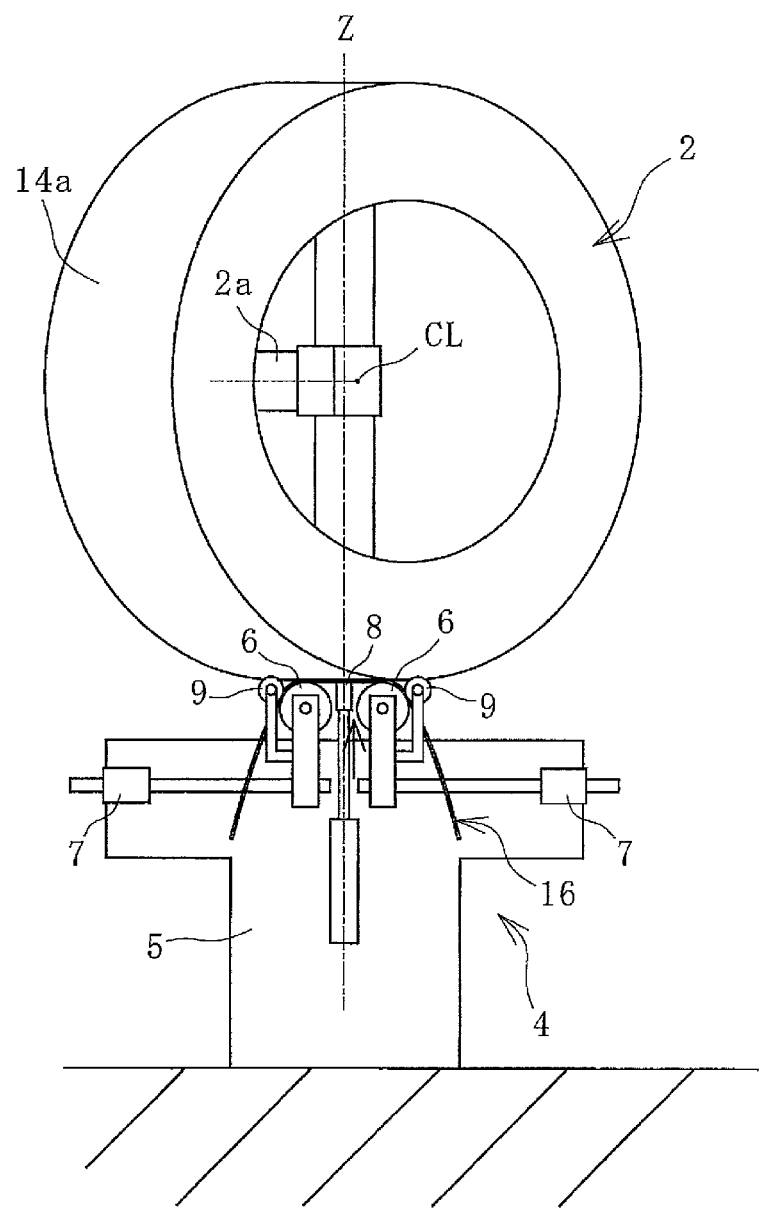
FIG. 6 is an explanatory diagram illustrating a state in which the central portion in the longitudinal direction of the strip material is bonded to the green tire of FIG. 5 in a front view of the forming device.

Therefore, the belt layer 15 is formed by actuating the rigid core 2 and the bonding unit 4 along the profile of the outer circumferential surface 2b of the rigid core 2 that is inputted to the control unit 10 and preliminarily known. As illustrated in FIG. 6, the pressing body 8 is moved upward of the strip material 16 which spans over the pair of pressing rollers 6. Accordingly, the central portion M of the strip material 16 in the longitudinal direction is pressed against the molding surface 14a and bonded at the central portion of the rigid core 2 in the width direction.

Figure 7:
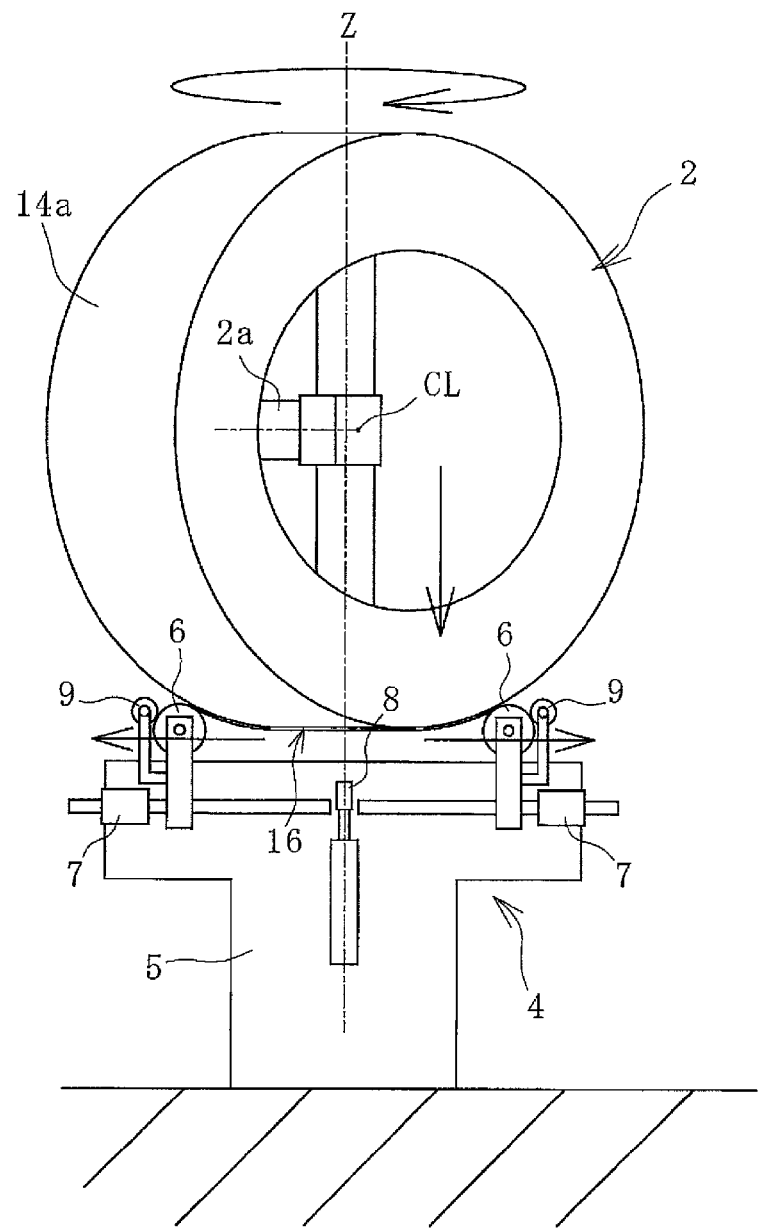
FIG. 7 is an explanatory diagram illustrating in a plan view of the forming device, a state in which the strip material is bonded to the green tire of FIG. 6 with the strip material extended in the longitudinal direction.
Figure 8:
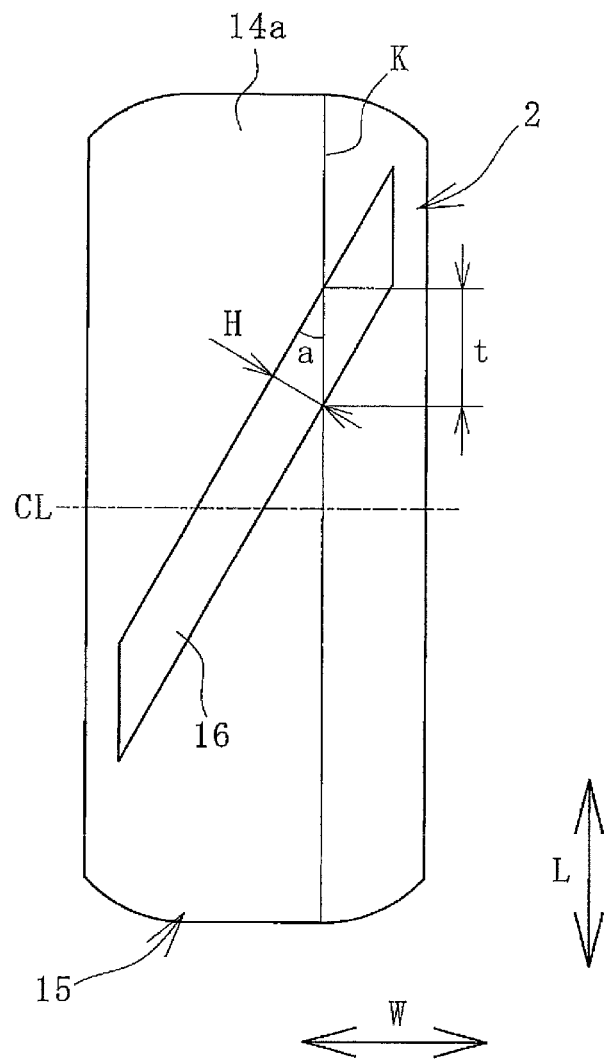
FIG. 8 is an explanatory diagram illustrating the rotation angle of the rigid core when the strip material is bonded to the molding surface.

Next, as illustrated in FIG. 7, the rigid core 2 is moved downward so as to bring the molding surface 14a in proximity with the strip material 16 to be bonded to the molding surface 14a, and the strip material 16 is bonded to the molding surface 14a in a manner of extending in the longitudinal direction while turning the rigid core 2 about the revolution axis Z. More specifically, with the downward movement of the rigid core 2, the rigid core 2 is turned in a direction in which the circumferential angle of the rigid core 2 with respect to the longitudinal direction of the strip materials 16 to be bonded changes, so that the variation in the bonding margin, due to the position in the width direction of the rigid core 2 (the bonding length in the circumferential direction of the opposing end surfaces of the strip materials 16 adjacent in the circumferential direction), between the strip materials 16 that are to be bonded adjacent to each other in the circumferential direction of the molding surface 14a is reduced. Adjacent strip materials 16 are brought essentially in contact and bonded, and thus the bonding margin is neither plus nor minus, but is close to zero.

At both end portions in the width direction in the range corresponding to the tread of the rigid core 2, the circumferential length of the molding surface 14a is shorter than that of the central portion in the width direction. Therefore, when bonding the strip material 16, the rigid core 2 is turned so that the inclination angle a is greater at both end portions in the width direction than in the central portion in the width direction.

Then, along with the turning of the rigid core 2, the pair of pressing rollers 6 are horizontally moved in a direction away from each other. As a result, the strip material 16 to be bonded is sandwiched between the molding surface 14a and the pressing rollers 6, and the strip material 16 is extended in the longitudinal direction and pressed against and bonded to the molding surface 14a.

For example, when it is set in advance to use N strip materials 16 having the same specification (strip width H) to form the belt layer 15, the rigid core 2 would be turned as described below. The circumferential length K of the molding surface 14a at the position in the width direction of the rigid core 2 illustrated in FIG. 8 can be predetermined. Then, in a case where the strip material 16 is bonded at an inclination angle a with respect to the circumferential direction of the rigid core 2, the length t of the strip material 16 in the circumferential direction of the rigid core 2 at the position in the width direction is t=H/Sin(a). Then, the circumferential length K=the length t×N, so the following Equation (1) is introduced.

$$\text{Inclination angle } a = \text{Sin}^{-1}(H \cdot N/K) \tag{1}$$

Thus, when bonding each of the strip materials 16 to the molding surface 14a, the rigid core 2 is turned so that the inclination angle a of the strip material 16 satisfies Equation (1) above, depending on the position in the width direction of the rigid core 2.

In this embodiment, the profile of the rigid core 2 has a symmetrical shape with respect to the center in the width direction, and thus, after bonding the central portion M in the longitudinal direction of the strip material 16 to be bonded to the molding surface 14a at the central portion in the width direction of the rigid core 2, the strip material 16 is bonded from the central portion M in the longitudinal direction toward both ends in the longitudinal direction. This is advantageous to complete the bonding of the strip materials 16 in a shorter time.

In a case where the profile of the rigid core 2 is asymmetrical with respect to the center in the width direction, after bonding the central portion M in the longitudinal direction of the strip material 16 to be bonded to the molding surface 14a at the central portion in the width direction of the rigid core 2, for example, the strip material 16 is bonded to the molding surface 14a from the central portion M in the longitudinal direction toward one end in the longitudinal direction. Then, the strip material 16 may be bonded to the molding surface 14a starting from the central portion M in the longitudinal direction toward the other end in the longitudinal direction.

Figure 9:
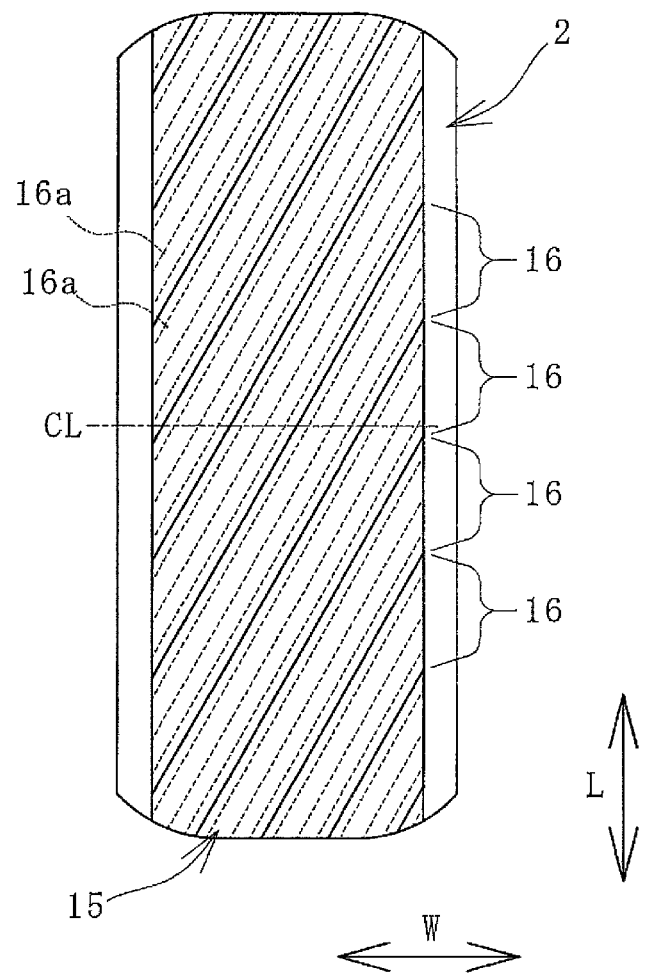
FIG. 9 is an explanatory diagram illustrating in a front view of the tire, a green tire that is being formed and on which a belt layer has been formed.

By bonding the plurality of strip materials 16 to the molding surface 14a in this manner, the belt layer 15 illustrated in FIG. 9 is formed. In a case of forming a plurality of belt layers 15 on the green tire 19, another belt layer 15 is formed on the outer circumferential side of the belt layer 15 by the same process.

In this embodiment, the movement in the strip width direction of the portion of the strip material 16 in close proximity to that bonded to the molding surface 14a is regulated by the guides 9. Therefore, even when the strip material 16 is bonded to the molding surface 14a while the rigid core 2 is turned, it is advantageous to prevent defects that the strip material 16 already bonded to the molding surface 14a is deviated.

Figure 10:
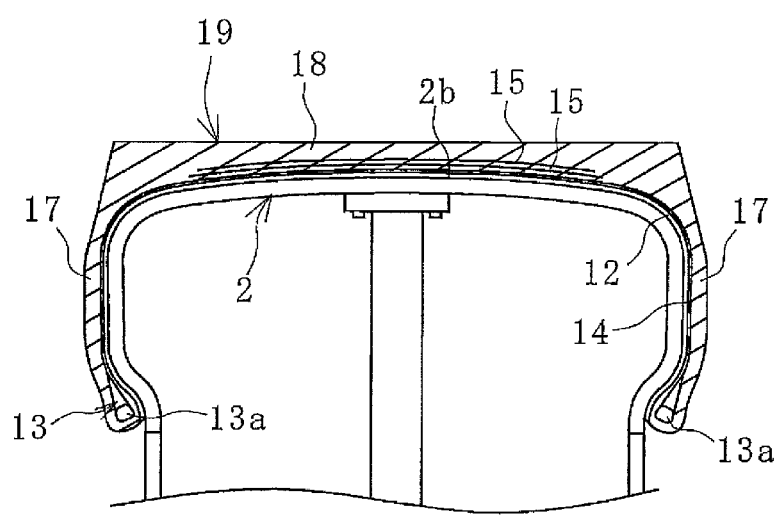
FIG. 10 is an explanatory diagram illustrating the upper half of a molded green tire as viewed in a cross-sectional view.

Next, in order to form the green tire 19 illustrated in FIG. 10, necessary tire components such as a belt reinforcing layer, unvulcanized tread rubber 18, and the like are sequentially bonded to the outer circumferential surface of the belt layer 15. In this way, a green tire 19 having a belt layer 15 is formed.

Figure 11:
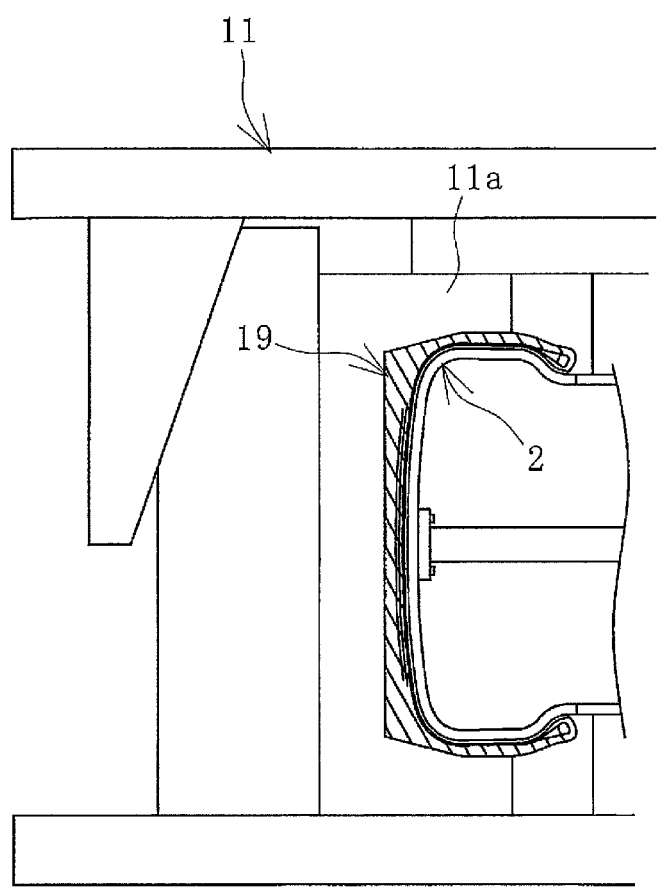
FIG. 11 is an explanatory diagram illustrating in a cross-sectional view of a vulcanization device, a step of vulcanizing a green tire.
Figure 12:
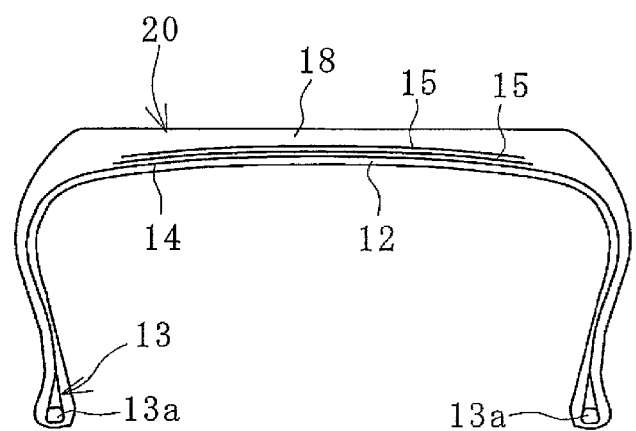
FIG. 12 is an explanatory diagram illustrating in a cross-sectional view, the upper half of the manufactured tire after vulcanization.

Next, as illustrated in FIG. 11, the green tire 19 and the rigid core 2 are disposed inside a vulcanization mold 11a installed in a vulcanization device 11, and the vulcanization mold 11a is closed. Then, by vulcanizing the green tire 19 under predetermined conditions inside the closed vulcanization mold 11a, the tire 20 illustrated in FIG. 12 (the pneumatic tire 20 in this embodiment) is completed. After removed from the vulcanization mold 11a, the completed tire 20 is separated from the rigid core 2.

In a case of manufacturing a tire 20 integrated with the wheel, the wheel may be used as the rigid core 2, for example. When manufacturing a tire 20 having such a configuration, it is not necessary to separate the completed tire 20 from the rigid core 2 (wheel) after vulcanizing the green tire 19.

Figure 13:
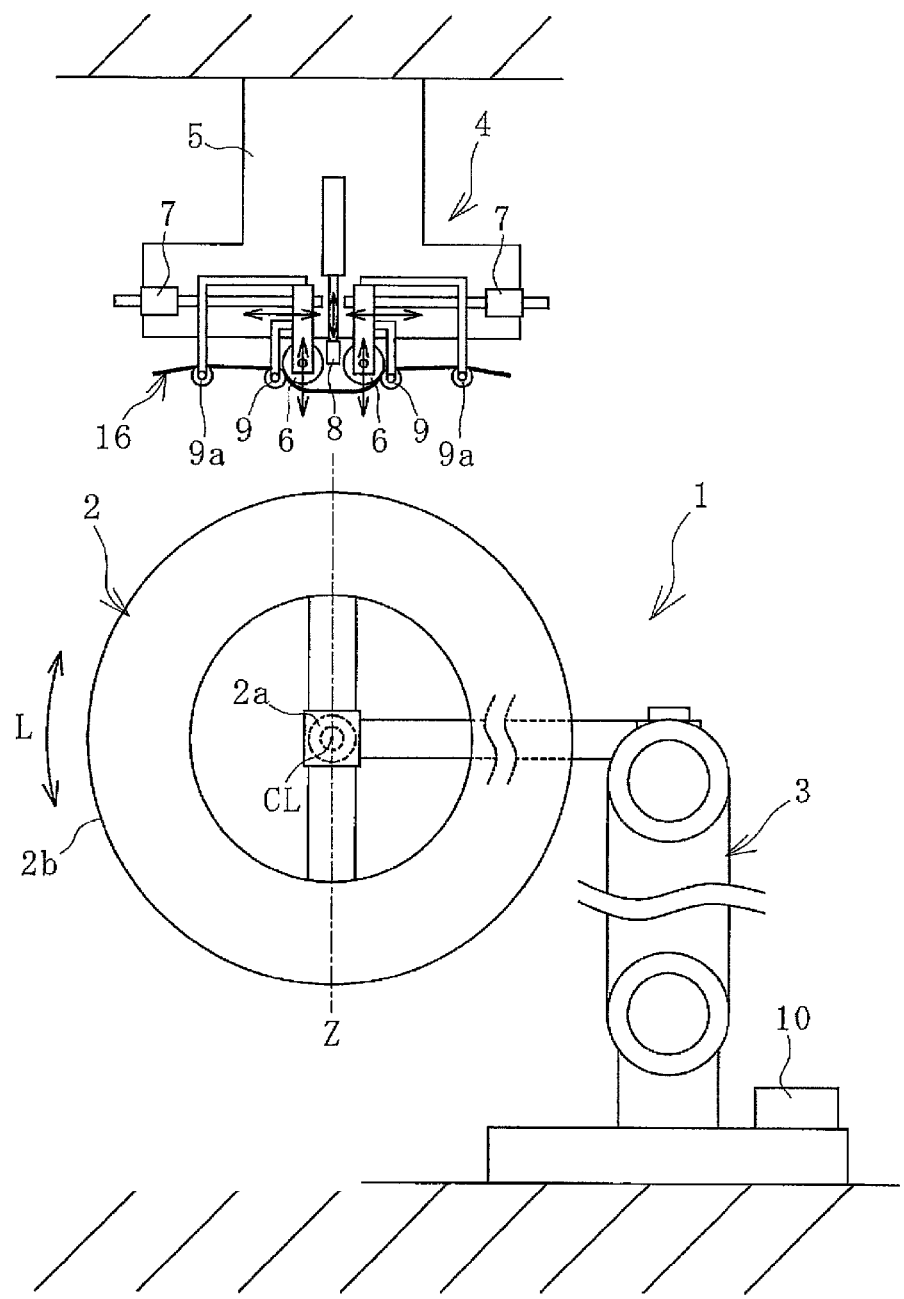
FIG. 13 is an explanatory diagram illustrating in a front view, a forming device in which a rigid core is disposed below a bonding unit.

In the forming device 1 described above, the belt layer 15 is formed such that the rigid core 2 is disposed above the bonding unit 4; however, as in the case of the forming device 1 illustrated in FIG. 13, the belt layer 15 may be formed such that the rigid core 2 is disposed below the bonding unit 4. In the forming device 1, the bonding unit 4 (base frame 5) is installed in a fixed state of being suspended downward from the support surface, and the rigid core 2 is movable by the freely moving arm 3.

The forming device 1 has a configuration in which the vertical position relationship of the rigid core 2 and the bonding unit 4 of the forming device 1 illustrated in FIG. 1 is reversed, and the other configurations are substantially the same. However, the forming device 1 has a support roller 9a on the outer side of each guide 9. The strip material 16 is inserted between the pressing roller 6 and the guide 9 so as to span over the pair of pressing rollers 6, and both end portions of the strip material 16 in the longitudinal direction are supported by the support rollers 9a.

In addition, in the forming device 1, the pair of pressing rollers 6 can be moved vertically. The configuration that allows the pair of pressing rollers 6 to move vertically is not essential, and may be adopted as necessary.

In order to form the belt layer 15 using the forming device 1, the same method described in the above embodiment may be used. When bonding the strip material 16 to the outer circumferential surface 14a of the carcass layer 14 bonded to the outer circumferential side of the rigid core 2, the pair of pressing rollers 6 are moved downward as necessary. This makes it easier to adhere the strip material 16 to the outer circumferential surface 14a.

Figure 14:
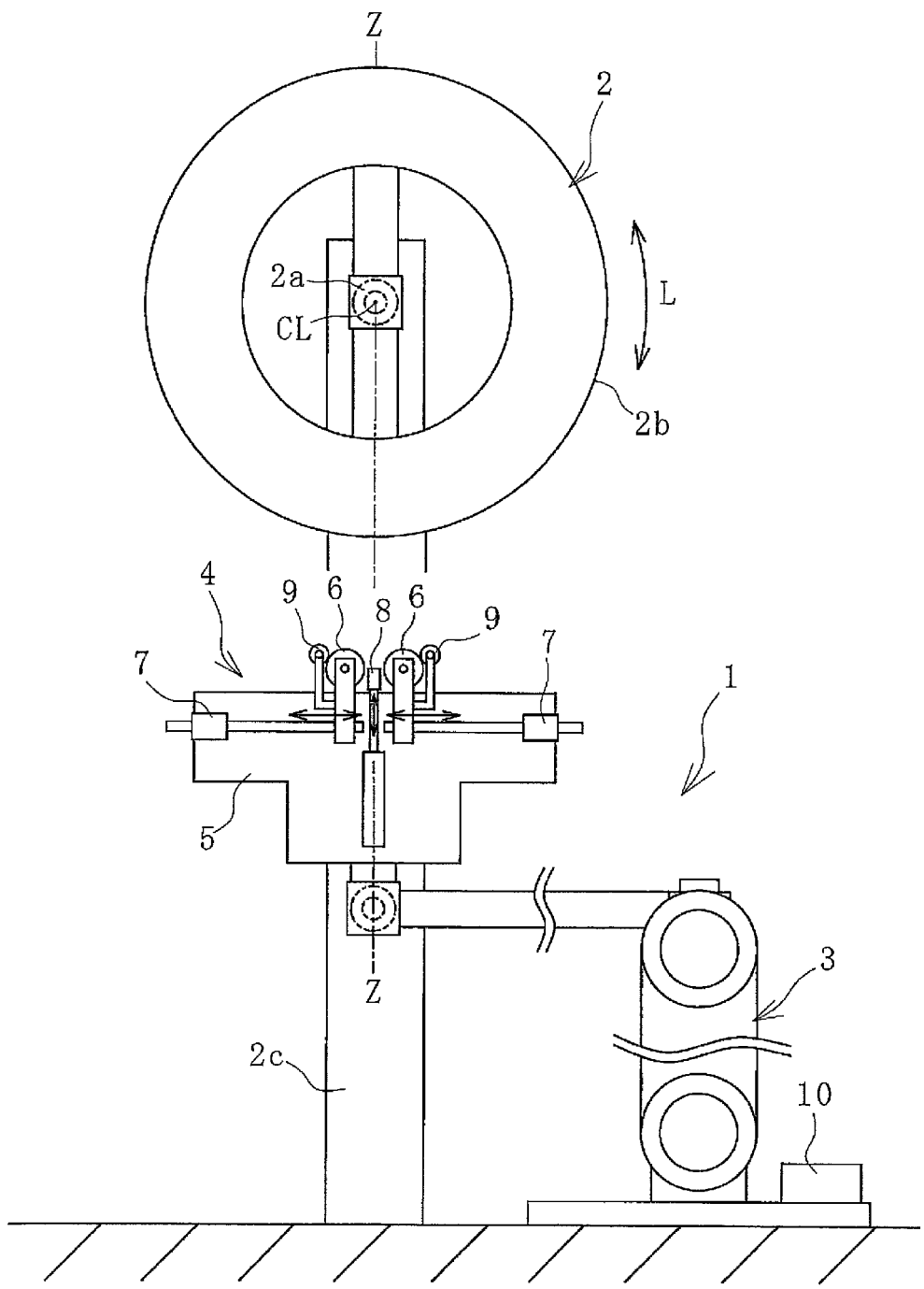
FIG. 14 is an explanatory diagram illustrating in a front view, another forming device used in the present technology.
Figure 15:
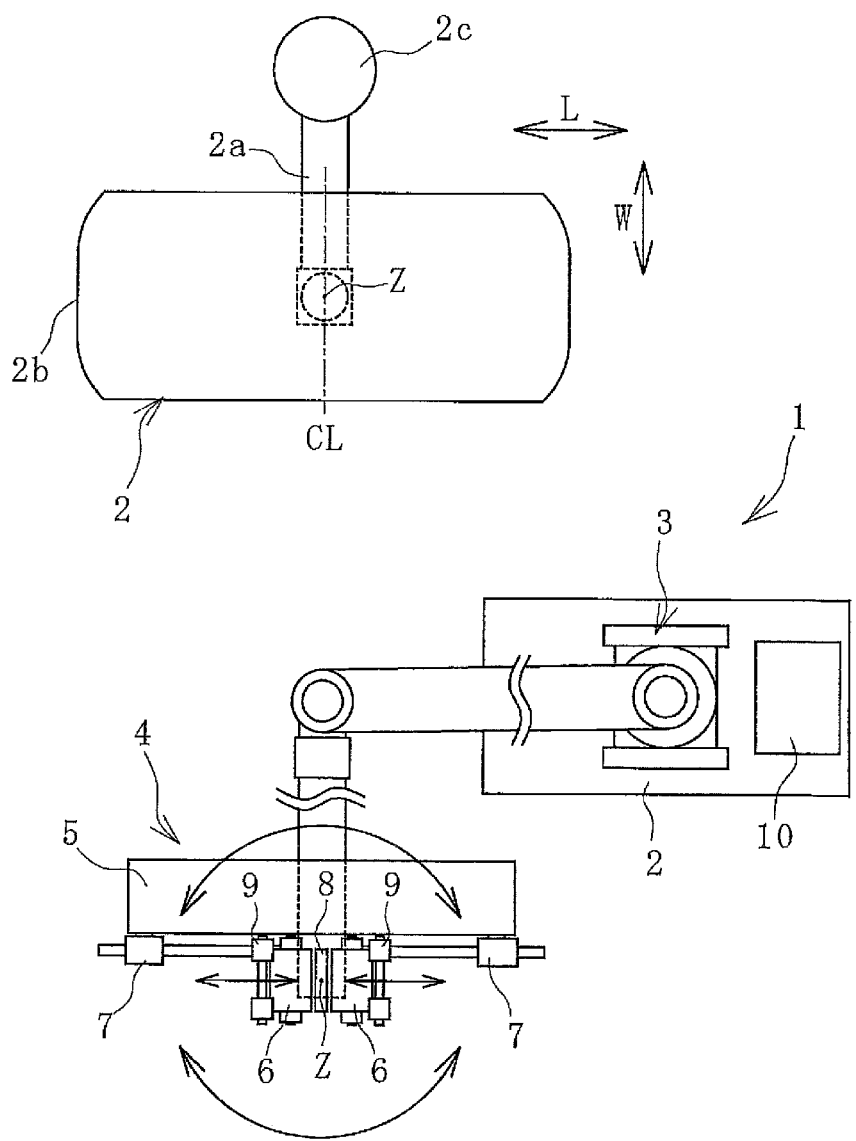
FIG. 15 is an explanatory diagram illustrating in a plan view, the forming device of FIG. 14.

In another forming device 1 illustrated in FIGS. 14 and 15, the rigid core 2 is able to rotate about a center shaft 2a fixed to a supporting column 2c erected on the floor. In other words, the rigid core 2 is installed on the floor surface in a fixed state (a state in which the rigid core 2 is unable to move in a plane). The bonding unit 4 is installed in a manner movable to any arbitrary position by the freely moving arm 3. The bonding unit 4 is able to turn about a revolution axis Z that extends vertically through the center of the pressing body 8 when viewed in a plan view. Note that the rigid core 2 is fixed so that it is unable to turn about the revolution axis Z.

Figure 16:
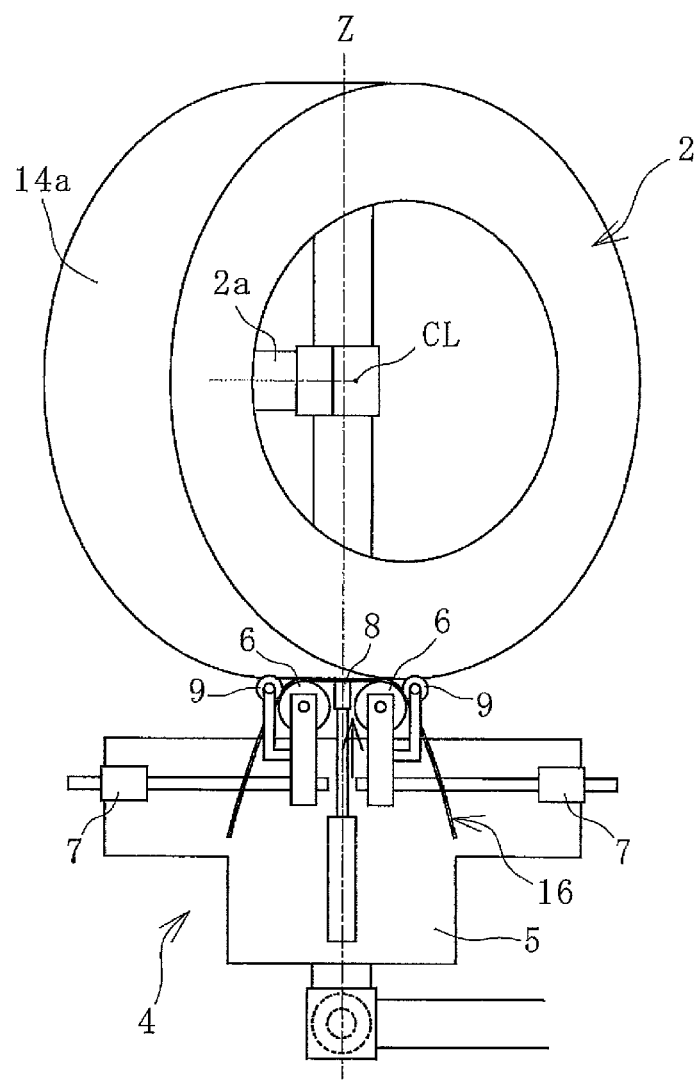
FIG. 16 is an explanatory diagram illustrating in a front view of the forming device, a state in which the central portion in the longitudinal direction of a strip material is bonded to a green tire by the forming device of FIG. 14.

In the procedure of manufacturing the tire 20 using this forming device 1, similar to the previous embodiment, the belt layer 15 is formed by actuating the rigid core 2 and the bonding unit 4 along the profile of the outer circumferential surface 2b of the rigid core 2 that is inputted to the control unit 10 and preliminarily known; however, in this embodiment, the bonding unit 4 is moved. Thus, as illustrated in FIG. 16, the pressing body 8 is moved upward of the strip material 16 in a state in which the strip material 16 spans over the pair of pressing rollers 6. Accordingly, the central portion M of the strip material 16 in the longitudinal direction is pressed against the molding surface 14a and bonded at the central portion of the rigid core 2 in the width direction.

Next, the bonding unit 4 is moved upward so that the molding surface 14a is in close contact with the strip material 16 that is to be bonded to the molding surface 14a, and while turning the bonding unit 4 about the revolution axis Z of the rigid core 2, the strip material 16 is bonded to the molding surface 14a in a manner of extending in the longitudinal direction. More specifically, with the upward movement of the bonding unit 4, the revolution axis Z of the bonding unit 4 is made to coincide with the revolution axis Z of the rigid core 2 in a direction in which the angle of the circumferential direction of the rigid core 2 with respect to the longitudinal direction of the strip material 16 to be bonded changes, and the bonding unit 4 is turned about that revolution axis Z, so that the variation in the bonding margin, due to the position in the width direction of the rigid core 2 (the bonding length in the circumferential direction of the opposing end surfaces of the strip materials 16 adjacent in the circumferential direction), between the strip materials 16 that are to be bonded adjacent to each other in the circumferential direction of the molding surface 14a is reduced. Adjacent strip materials 16 are brought essentially in contact and bonded, and thus the bonding margin is neither plus nor minus, but is close to zero.

At both end portions in the width direction in the range corresponding to the tread of the rigid core 2, the circumferential length of the molding surface 14a is shorter than that of the central portion in the width direction. Therefore, when bonding the strip material 16, the bonding unit 4 is turned such that the inclination angle a is larger at both end portions in the width direction than at the center in the width direction.

Figure 17:
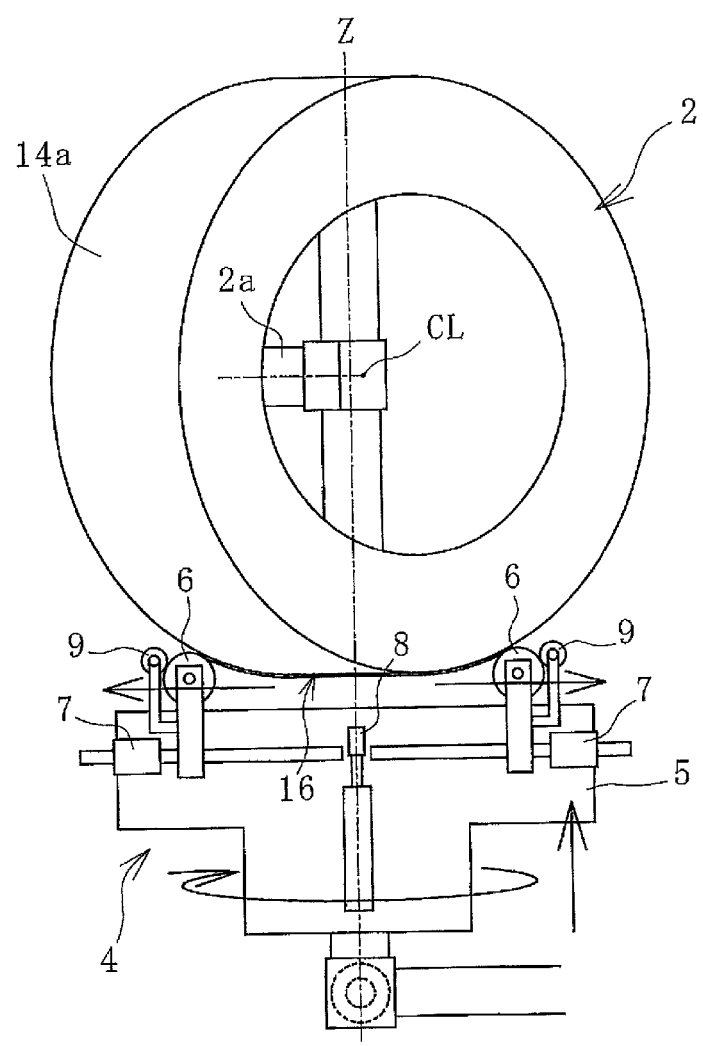
FIG. 17 is an explanatory diagram illustrating in plan view of the forming device, a state in which a strip material is extended in the longitudinal direction and bonded to the green tire of FIG. 16.

Then, as illustrated in FIG. 17, with the rotation of the bonding unit 2, the pair of pressing rollers 6 are horizontally moved in a direction away from each other. As a result, the strip material 16 to be bonded is sandwiched between the molding surface 14a and the pressing rollers 6, and the strip material 16 is extended in the longitudinal direction and pressed against the molding surface 14a and bonded.

By bonding a large number of strip materials 16 to the molding surface 14a in this manner, the belt layer 15 illustrated in FIG. 9 is formed. The subsequent steps are the same as in the previous embodiment. Note that the arrangement described in the previous embodiment may be similarly applied to this embodiment as well.

In the present technology, while moving the rigid core 2 relatively so that the molding surface 14a moves close to the strip material 16, and bonding the strip material 16 to the molding surface 14 in a manner of extending in the longitudinal direction while relatively turning the rigid core 2, variation in the bonding margin due to the position in the width direction of the rigid core 2 is reduced between the strip materials 16 that are to be bonded adjacent to the molding surface 14a in the circumferential direction. Therefore, this is advantageous to prevent the strip materials 16 bonded to the molding surface 14a and adjacent to each other in the circumferential direction from excessively overlapping in the circumferential direction, or to prevent gaps in the circumferential direction between adjacent strip materials 16 from occurring. Therefore, it is possible to suppress bonding disorder between the strip materials 16 due to the circumferential length of the outer circumferential surface 2a of the rigid core 2 that varies depending on the position in the width direction. This also contributes to improved quality of the manufactured tire 20.

The invention claimed is:

1. A method for manufacturing a tire, comprising
sequentially bonding a large number of strip materials on a molding surface located on an outer circumferential side of a rigid core having an outer circumferential surface with a profile in which a circumferential length changes at a position in a width direction in a manner of extending the strip materials in a width direction of the rigid core at an inclined direction with respect to a circumferential direction of the rigid core, and arranging and bonding the strip materials in the circumferential direction, so that a belt layer is formed by bonding together the strip materials that are adjacently bonded in the circumferential direction;
forming a green tire having the belt layer; and
vulcanizing the green tire, wherein,
the profile of the rigid core is asymmetrical with respect to a center in the width direction,
the rigid core is relatively moved along the profile that is preliminarily known so that the molding surface is brought close to the strip material to be bonded to the molding surface,
the strip materials to be bonded are extended in the longitudinal direction and bonded to the molding surface while relatively turning the rigid core in a direction in which a circumferential angle with respect to the longitudinal direction of the strip materials to be bonded changes, so that variation in bonding margin, due to the position in the width of the rigid core, between the strip materials to be bonded adjacent to each other in the circumferential direction is reduced, and
after bonding the central portion in the longitudinal direction of the strip material to be bonded to the molding surface at a central portion of the rigid core in the width direction, the strip material to be bonded is bonded to the molding surface from the central portion in the longitudinal direction to one end in the longitudinal direction, then the strip material to be bonded is bonded to the molding surface from the central portion in the longitudinal direction to the other end in the longitudinal direction.

2. The method for manufacturing a tire according to claim 1, wherein movement in the width direction of a portion of the strip material to be bonded in close proximity to that bonded to the molding surface is regulated by a guide which is disposed on both sides of the strip material in the width direction.

\* \* \* \* \*